United States Patent [19]
Hurst

[11] Patent Number: 6,156,284
[45] Date of Patent: Dec. 5, 2000

[54] PROCESSING PROCEDURE FOR TRANSFORMING PREVIOUSLY UNUSABLE CLAYS AND KAOLIN CLAYS TO LOW VISCOSITY PIGMENT

[76] Inventor: Vernon J. Hurst, 445 Westview Dr., Athens, Ga. 30606-4637

[21] Appl. No.: 09/307,268

[22] Filed: May 7, 1999

[51] Int. Cl.[7] .................................................. C01B 33/26
[52] U.S. Cl. ..................................... 423/328.2; 423/328.1; 106/481; 106/482; 106/483; 106/484; 501/141; 501/145; 501/146; 501/147; 501/150
[58] Field of Search .............................. 423/327.1, 328.1, 423/328.2; 106/481, 482, 483, 484; 501/141, 145, 146, 147, 150

[56] References Cited

U.S. PATENT DOCUMENTS

| | | | |
|---|---|---|---|
| 4,826,536 | 5/1989 | Raythatha et al. | 106/465 |
| 5,112,782 | 5/1992 | Brown et al. | 501/144 |
| 5,543,372 | 8/1996 | Shi et al. | 501/145 |
| 5,545,599 | 8/1996 | Pickering, Jr. et al. | 501/146 |
| 5,685,899 | 11/1997 | Norris et al. | 106/487 |
| 5,840,113 | 11/1998 | Freeman et al. | 106/487 |
| 5,891,326 | 4/1999 | Shi et al. | 209/166 |

*Primary Examiner*—Tom Dunn
*Attorney, Agent, or Firm*—Morgan & Finnegan LLP

[57] ABSTRACT

An improved process for transforming clays that cannot be utilized in commercial pigment production to low-viscosity pigment for commercial application is described whereby a treated clay is produced having a reduced viscosity as compared to the initial clay when compared at equivalent solids content. The process comprises the steps of: drying the clay; mixing the dried clay with an aqueous solution of an alkali metal salt wherein the alkali metal salt is selected from the group consisting of lithium, potassium, rubidium and cesium salts; extruding the material obtained from alkali metal salt treatment; heat-treating the extruded material and high-shear blunging of the heat-treated material. Typically, a high viscosity clay that has been treated with this five-step procedure will exhibit a viscosity that is about 10% to about 20% of the viscosity of the starting clay.

21 Claims, No Drawings

PROCESSING PROCEDURE FOR TRANSFORMING PREVIOUSLY UNUSABLE CLAYS AND KAOLIN CLAYS TO LOW VISCOSITY PIGMENT

BACKGROUND OF THE INVENTION

Many deposits of very fine-grained clay and kaolin clay known to be transformable to high-brightness clay by HIEMS (high-intensity electromagnetic separation), ozonation, and acid leaching cannot be utilized in commercial pigment production because of an inherent high viscosity and tendency to gel on ageing.

Previous attempts to reduce the viscosity of kaolin clays have utilized physical treatments such as viscous kneading (U.S. Pat. Nos. 2,535,647 and 2,907,666), high intensity agitation (U.S. Pat. No. 3,106,476) and pugging followed by treatment with hot water (U.S. Pat. No. 3,301,691).

Other approaches have combined physical and chemical treatments. Exemplary methods include pugging in an aqueous solution of urea (U.S. Pat. No. 3,510,330), pugging in an aqueous solution of an organic carboxylic acid followed by washing (U.S. Pat. No. 3,510,331), hydrothermal treatment or hydrothermal treatment with added monovalent and divalent cations (U.S. Pat. Nos. 3,614,075 and 3,765,825), extrusion followed by fractionation (U.S. Pat. No. 3,635,662), treatment with various acids and their salts including ascorbic acid, the pentasodium salt of diethylenetriamine pentacetic acid, citric acid, tartaric acid or gluconic acid (U.S. Pat. Nos. 3,892,587, 3,961,979, 4,144,083, 4,144,084 and 4,144,085), treatment with inorganic polymer (U.S. Pat. Nos. 4,030,941 and 4,105,466), reductive bleaching with an alkali metal hydrosulfite followed by treatment with barium ions (U.S. Pat. No. 4,182,785), dispersion in the presence of water soluble citrate and water soluble polyacrylate (U.S. Pat. No. 4,309,222), blunging with polyacrylic acid as a dispersant (U.S. Pat. No. 4,916,094), mechanical delamination (U.S. Pat. Nos. 5,169,443 and 5,411,587) and treatment with magnesium ions followed by pH adjustment (U.S. Pat. No. 5,707,912). All of these patents are hereby incorporated by reference in their entirety.

Despite the wealth of approaches to the preparation of reduced viscosity kaolin clays reflected in the aforereferenced patents, no one approach has been developed which is capable of consistently and reproducibly effecting a substantial reduction in viscosity of the initial clay.

SUMMARY OF THE INVENTION

An improved process for transforming clays that cannot be utilized in commercial pigment production to low-viscosity pigment for commercial application is described. The process can be employed to convert very high viscosity, commercially unusable clay to a low viscosity clay. The process also can be applied to a moderate viscosity or low viscosity clay to produce a clay with lower viscosity than the starting material. This process is particularly applicable to kaolin clays.

The process of the invention is comprised of the following treatment steps. (1) The high viscosity crude or processed clay (with an initial viscosity greater than about 500 cps), optionally degritted, is dried to a low moisture content, preferably about 1% to about 3% water by weight. (2) The dried clay is then intimately admixed with an aqueous solution of an alkali metal salt in an amount sufficient to decrease the per cent solid content of the clay-water mixture to about 50% to about 82% solids, preferably about 75% to about 81% solids, most preferably 77% to about 80% solids wherein per cent solid content is by weight. For most applications, the solid content of the clay-water mixture will be between about 75% to about 80% solids. (3) The clay-water mixture is then extruded through small holes, preferably between about ⅛ inch to about 5/32 inch in diameter, in a die plate on a suitable mixer or pugmill. (4) The extruded, chemically treated clay is heat treated for about one to about two hours at a temperature between about 150° C. to about 500° C., preferably between about 300° C. to about 350° C. (5) Finally, the heat treated extruded clay noodles are processed by high-shear blunging, preferably with a dispersant, to yield a clay slurry with a viscosity lower than that of the starting clay. Typically, a high viscosity clay, treated with the five-step procedure outlined above will exhibit a viscosity that is about 10% to about 20% of the viscosity of the starting clay.

To achieve optimal viscosity reduction in kaolin clays with a Brookfield viscosity greater than about 2,000 cps, the inventive procedure must include the five process steps set forth above. If the starting kaolin clay has a viscosity less than about 2,000 cps, one or more processing steps may be omitted. Performance of the remaining steps will still yield a clay with reduced viscosity relative to the starting clay. If the clay is not chemically treated (i.e., step 2 is omitted), the drying step (step 1) may also be omitted. However, eliminating both the drying (step 1) and chemical treatment (step 2) will impair the effectiveness of the remaining viscosity reduction treatment steps (steps 3, 4 and 5). Regardless of the number of steps employed to process the clay, it is critical that the treatment steps be performed in the order specified. For easier to process kaolins, i.e., those clays with a viscosity less than about 2,000 cps, one or more of the steps may be omitted, but processing the clay using the complete five-step process outlined above will yield a kaolin clay with a viscosity less than that obtainable by following the process with one or more steps omitted.

The number of processing steps employed to achieve a viscosity reduction in the starting clay will be determined by the starting viscosity of the degritted crude clay and the acceptable viscosity range for the intended application utilizing the final processed clay. For example, if the viscosity of the degritted crude clay is only a few hundred cps higher than required for the intended use, treatment steps 4 and 5 may be sufficient to attain the target viscosity. If the lowest possible viscosity is required or the viscosity of the degritted crude clay is very high, all five treatment steps must be employed to attain the best viscosity reduction.

Additional processing steps such as HIEMS (high-intensity electromagnetic separation), ozonation, and leaching/bleaching, commonly utilized to remove minor deleterious pigments and ensure a high-whiteness clay, may be used when needed, in addition to the processing steps of this invention.

Other processing steps like fractionation, filtration, washing, and spray drying may also be used as needed. However, the effect of these processing steps on viscosity reduction is small.

Typically, additional processing steps such as fractionation, HIEMS, ozonation and leaching/bleaching steps should be performed after application of the inventive process and not as part of it because these additional processing steps are most effective after the clay sample has been fully dispersed. Filtration, washing and spray drying steps can be used to treat the clay after the inventive process. The clay may also be filtered after it is degritted.

The processing methods employed in the inventive process such as chemical treatment, heating and blunging have been employed previously in the art of kaolin processing to treat many different kinds of clay as set forth in the "Background Of The Invention" above. However, the inventive process combines or modifies these treatment steps so that a superior low-cost reduced viscosity pigment is reproducibly obtained from heretofore intractable clays and kaolin clays.

The sequencing of the disclosed processing steps is critical to achieve the complex chemical-crystal-structural changes necessary to transform fine-grained multi-mineralic clays and kaolins into a lower viscosity product. A full discussion of how the inventive process achieves these changes is beyond the scope of this disclosure because such a discussion is specific and unique to each individual sample of clay or kaolin clay treated by the inventive method. However, in general, the inventive procedure reliably and reproducibly achieves a significant viscosity reduction in the starting clay because it successfully reduces or eliminates the amount of viscosity-enhancing phases in the clay as described below.

All crystal structures and solid phases have finite stability fields which are generally defined by inter alia the chemistry of the solid phases, whether or not the system is aqueous, the bulk composition of the kaolin-water system, the kind and concentrations of ions (when the system is aqueous), temperature, total pressure, partial pressure of one or more gases or water vapor, Eh and pH. When a solid phase is subjected to physio-chemical conditions under which it is unstable, it may persist as a metastable phase until such time as energy equivalent to its crystallization energy and any required activation energy becomes available. Only when this energy is provided to the phase can the atoms in the metastable structure dissociate as mobile species or regroup as another, more stable solid.

Weathering products like kaolin and saprolite contain many minerals that are metastable phases under wet processing conditions. Some of these minerals are major contributors to the high slurry viscosity exhibited by the host clay. Obviously, then, one way to reduce high slurry viscosity of the bulk clay is to eliminate or drastically reduce the percentage of these metastable phases in the bulk clay sample. As noted above, one way to disrupt these phases is by providing the requisite crystallization and/or activation energy necessary to disrupt the structured arrangement of atoms that constitute the metastable phase.

The energy necessary to break down an undesirable crystalline component in the bulk clay may be supplied by; 1.) initiating a chemical reaction on the crystalline surface; 2.) thermal heating or 3.) high shear. A chemical reaction is a specific process by which old bonds are broken or weakened before new bonds are formed and allows a mineral to be dismantled or transformed into another phase. Thermal heating delivers limited amounts of energy to the crystalline lattice in a non-specific manner. High shear distorts the pattern of bonding in the crystal thereby weakening or breaking individual bonds while simultaneously providing the requisite local energy to overcome activation energy barriers.

Each type of energy may be separately applied to disrupt the crystalline lattice. However, the simultaneous application of all three sources of disruptive energy, collectively termed mechano-chemical treatment and embodied in the inventive procedure, is by far the most effective way of disrupting the metastable crystalline phases that are responsible for the high slurry viscosity of the kaolin clays.

The mechano-chemical treatment set forth in the inventive procedure reduces the viscosity of the bulk clay by reducing or eliminating metastable phases in the clay which contribute to high viscosity. The mechano-chemical inventive process disrupts the undesirable phases by simultaneously weakening and/or breaking strong high-energy bonds, by rapidly generating localized high internal energy to overcome activation energy barriers and by providing additional atoms in the form of added chemicals to allow conversion of the undesirable phases to phases which do not raise the viscosity of the bulk clay.

The inventive procedure is practical and easy to implement because it makes maximal use of existing equipment.

The process can be used to treat certain fine-grained Tertiary kaolins found on the coastal Plain of southeastern U.S.A. The process is also applicable to other major types of kaolin clays such as the gray and dark-colored kaolins in Nova Scotia and to widespread saprolitic kaolins, as typified by the Sparta area of southeastern U.S.A.

The term "kaolin" as used herein is understood to encompass clayey rock consisting predominantly of one or more kaolin minerals with color ranging in value from white to almost black and in hue from pink to yellow-brown or red-brown. Kaolin can be soft, earthy or hard or even brittle and non-plastic. The inventive process is generally applicable to high-viscosity kaolins wherever their point of origin and may also be used successfully with other clays that are not strictly kaolins. As used herein, a clay is understood to encompass a finely particulate material consisting of particles that are friable or tend to adhere wherein the particles are less than about 4 microns in diameter, but without compositional connotations. In referring to a common clay of a particular composition, a special rock name is typically used, e.g. kaolin.

PREFERRED EMBODIMENTS OF THE INVENTION PHYSICAL-CHEMICAL TREATMENT STEPS

The process of the invention is comprised of the following treatment steps. A crude clay (with an initial viscosity greater than is optimal for the desired application), is first dried to a low moisture content, preferrably, from about 1% to about 3% by weight. To avoid irreversible, deleterious structural changes in the crude clay, the moisture content should not be less than about 0.5% by weight.

Typically, the moisture content of the clay is determined by weighing a small sample of the clay, and then drying it in a thermal or microwave oven to a constant weight. The difference in weight between the starting sample and the oven-dried clay will represent the weight of water in the clay. Alternatively, the moisture content of the sample may be determined using a moisture balance such as that sold by CSC Scientific Company.

The clay may be degritted before drying if its grit content initially is too high for the intended application. Degritting is preferably accomplished by first blunging the clay, preferably without a dispersant although a dispersant may be used, and then passing the resultant slurry through a U.S. Standard 325 mesh sieve to remove the grit. In the degritting procedure, coarse particles (larger than about 44 microns in diameter) will be retained by the sieve and scalped off as grit, while smaller particles less than about 44 microns in diameter will pass through the sieve as degritted clay. Degritting may be carried out by hand-shaking the clay in a small sieve or by using a large vibrating sieve or an array of sieves. For larger samples, a "sand-box" may be used.

Optimally, the clay should not be over-dried. Preferably, the clay is dried at a temperature between about 95° C. and about 125° C. Drying at temperatures lower than 95° C. will lengthen the amount of time needed to attain a moisture level of about 1% to about 3% by weight. Heating above about 95° C. but below about 125° C. will shorten the drying time and will not damage the clay if the time is limited so that the clay is not overdried. The moisture content of the clay may be periodically checked during the drying process by withdrawing a small sample of the clay and determining its moisture content to prevent over-drying.

The clay may be heated in a convection oven or it may be heated to the desired temperature in a microwave oven. Other heating methods or devices may be used provided that the temperature of the clay does not exceed about 125° C. If a clay is heated above 95° C. but below 125° C., the clay will dry faster, but the overall cost to process the clay will generally rise. Most preferably, the clay is heated at about 95° C. until the moisture content of the clay is from about 1% to about 3%.

After drying, the clay is mixed with enough water to produce a clay-water mixture with a solids content of from about 50% to about 82%, preferably from about 77% to about 80%. The water contains a dissolved alkali metal salt as described in detail below.

Suitable grades of water include distilled water, deionized water and relatively pure well water. Distilled and deionized water may be used for laboratory scale processing while the purest available well water will commonly be used for large-scale plant processing. The quality of the water is easily assessed by ICP analysis. Preferably, the water will be free of any multivalent cations that can participate in redox reactions such as ions of iron, manganese, cobalt and vanadium. The water should also preferably be free of carbon and sulfur.

Given the quantity of water required to treat the clay in a processing plant, it is unlikely that the water available for use in this quantity will be completely free of multivalent cations. However, best results will be obtained if the multivalent cation concentration of the water is as low as possible, preferably in the ppm or lower range. At concentration levels of multivalent cations in the ppm range, the treated clay may exhibit low brightness and/or undesirable color.

Generally speaking, the clay water mixture of step 2 must contain sufficient moisture so that it can be intimately mixed with the clay when mixing is aided by high shear, but not enough to impart fluidity. Sufficient energy must be imparted by high shear to heat the clay-water mixture.

The fluidity of the mixture is a function of the total solids content and is assessed by the appearance of the clay when extruded. When the mixture is barely fluid, the extruded noodles will be hot, dry, barely coherent and will have rough surfaces. If the mixture is too fluid, the solids content of the mixture is too low and the extruded noodles will have very smooth surfaces and will extend for several inches from the die plate before breaking. In the inventive process, the mixture at this stage of the process should be capable of yielding extruded noodles that are barely fluid.

For example, if a sample of the clay-water mixture is extruded in a pug mill, the solids content of the mixture is acceptable if the extruded noodles look dry and hot. However, if the clay is extruded in smooth, long noodles, the solids content of the mixture is too low.

As described above, an alkali metal salt is dissolved in the water used to prepare the above clay-water mixture. The amount of alkali metal salt ranges from about 0.1% to about 0.8% of the weight of dry clay, preferably about 0.1% to about 0.4% of the weight of dry clay and most preferably about 0.1% to about 0.3% of the weight of dry clay. The clay-water mixture is prepared by first dissolving the alkali metal salt in the water and then adding the solution to the dried clay by spraying a fine mist of the aqueous alkali metal solution onto the dried hygroscopic clay. In most cases, the weight of added alkali metal salt will be in the range of about 0.2% to about 0.4% of the weight of the dried clay. In some cases, it may be necessary to add the alkali metal salt in an amount up to about 0.8% of the weight of the dried clay.

The alkali metal is selected from the group consisting of lithium ($Li^+$), potassium ($K^+$), rubidium ($Rb^+$) and cesium ($Cs^+$). Preferably, the counter-anion is carbonate although other common counter anions such as chloride, sulfate and phosphate may also be chosen. A mixture of alkali metal salts may also be used, depending on the sheet charges of the expandable phases in the starting clay. For the majority of kaolin clays, the preferred alkali metal salts are lithium ($Li^+$) and potassium ($K^+$). The most preferred alkali metal salt is potassium ($K^+$). Rubidium ($Rb^+$) and cesium ($Cs^+$) are less preferred for large-scale applications because their salts are expensive but may still be used.

To achieve the greatest reduction in viscosity, the type and amount of added alkali metal salt is matched to the starting kaolin clay as follows. The process is first tried on a laboratory size sample (e.g. typically a few grams to a few pounds depending on the scale of the run and the processing equipment used) using the most preferred potassium salt as the alkali metal salt and the Brookfield viscosity of the sample measured using TAPPI procedure T648 cm-88 or T671 cm-55. If the viscosity reduction achieved is acceptable for the end-use, a potassium metal salt is then chosen for the large plant scale preparation of the clay (e.g. typically hundreds of pounds to tons of material). However, if the viscosity reduction achieved with the laboratory sample is not acceptable, the process is repeated with a second laboratory scale sample of the clay using a 50:50 mixture of potassium and lithium salts by weight to determine if this combination of salts will yield the desired viscosity reduction. If the viscosity reduction is still unacceptable, the bulk sample may contain an expandable mineral with vacant octahedral sites for which a lithium salt is the best choice. In this case, a third laboratory scale sample is prepared and treated according to the inventive process to determine if the lithium salt alone will yield the lowest viscosity reduction for this particular clay. The final choice of alkali metal salt for the large scale plant procedure will be determined by balancing the viscosity reduction achieved with a particular alkali metal salt or combination of same against the cost of using that reagent. The final salt chosen for the plant process will provide the greatest viscosity reduction for the least cost of alkali metal salt.

The water and dissolved alkali metal salt(s) are added to the clay so as to achieve even and intimate admixture throughout the clay-water mixture. As discussed above, one suitable procedure for obtaining the requisite intimate admixture is to spray the water with dissolved alkali metal salt(s) as a fine mist onto the dried, pulverized and thinly spread clay with intermittent stirring. For larger-scale treatment, a pin mill, modified pelletization equipment, or more specialized equipment may be employed.

The chemically treated clay is then extruded through about ⅛ inch to about 5/32 inch diameter holes in a die plate on a suitable mixer or pugmill. Preferably, the moistened clay is extruded through the smallest hole in the range through which it can practically be passed. A suitable mixer is any mixer or comparable device which produces a clay of uniform particle size and distribution. Two suitable extruders are a Hobart model 4146 Food Processor SN H-10420777 and a Reeves 8" Extruder 40 hp SN CF8N-125-D.

Other kinds of mills, such as a Kady mill, a Duncan mill or other macerator may also be used to macerate rather than extrude the clay but the clays so treated will not yield a reduced viscosity clay as reproducibly as the aforementioned devices. Preferably, the clay is extruded rather than macerated. For high shear at low solids content, the Hobart Food Processor, Reeves Extruder or comparable devices are preferred.

One to four passes through the die are sufficient if after each pass the noodles look hot and dry. Typically, at least two passes through the extruder will be required. For the majority of kaolin clays, no more than four passes through the extruder will be required.

Preferably, the extruded clay-water-chemical mixture should have a solids content of more than about 78%. Preferably, the extruded clay should have the highest possible percent solids content that can be obtained without jamming the die and which yields an extruded noodle that looks dry and hot.

The extruded, chemically treated clay is then processed by heat treatment. The clay is typically heated in a convection oven. The extruded clay noodles are thinly spread onto metal trays, placed in a convection oven, and held at a temperature from about 150° C. to about 500° C., preferably about 300° C. to about 350° C. for about one hour to about two hours. If the extruded clay is heated in a regular convection oven (i.e, an oven designed for convection while heating such as a Yamato fire oven Model No. DH62) with no control of the vapor pressure, the more preferred temperature range is about 250° C. to about 500° C. for about one to about two hours. Most preferably, the temperature range is from about 300° C. to about 350° C.

The effects of heating necessary to reduce the viscosity of the treated clay may vary with the wave-length of the heating energy, the rate at which it is applied, the duration of the heat treatment, the vapor pressure in the heated container, and mineralogical differences of the clay.

The efficacy of the heat treatment can be assayed by a trial viscosity measurement as set forth above for choosing the best alkali metal salt or salt combination. The typical sample size is about 400 to about 500 grams. For the trial measurements to determine the best heat treatment temperature, the clay may be sampled after one hour of heating and the viscosity measured to determine if the percent viscosity reduction obtained through the process up to and including this step is suitable for the intended application. If further reduction is necessary, the heating may be continued for the full 2 hours and the viscosity of the clay assayed again. If the viscosity reduction is still unsuitable for the intended application, the full five-step process must be employed to achieve the lowest possible viscosity reduction.

The heating time of the extruded clays can be shortened by use of microwave energy, which can be applied more rapidly and more homogeously than heat radiation from an oven. Virtually any type of microwave oven can be used provided that the cavity is large enough to accommodate the quantity of clay to be heated. The oven should also have a power rating high enough to heat the clay as rapidly as desired. Samples prepared on the laboratory scale can be heated with a small laboratory oven. The size and power rating of oven used for plant scale samples will be determined based on the quantity of clay to be heated and the desired rate of heating. If a high vapor pressure is maintained over the extruded clay as it is heated (i.e., if the clay is heated in a closed oven or device rather than an open oven), the mechano-chemical reactions between water, alkali metal salt, and the minerals in the clay described previously can be accelerated and the heating time shortened. The optimum vapor pressure is about 400 psi. As described above, a person of ordinary skill in the art can quickly assess whether or not the control of vapor pressure is important in the particular clay sample under study by carrying out the inventive process on two identical laboratory scale samples which differ only in the control of vapor pressure. The process which provides the lowest viscosity reduction will be the most suitable procedure for that particular clay sample.

After heat treatment, the clay noodles are then further processed by high-shear blunging as follows. The noodles are added slowly to sufficient water and dissolved dispersant to attain a clay slurry containing from about 45% to about 73% solids, preferably about 70% solids (wherein per cent solids is by weight) and subjected to high-shear blunging equivalent to that obtained in an 8" baffled cannister with a 3.5" diameter Cowles head turning at about 1,000 rpm to about 5,000 rpm, preferably about 3,000 rpm, for about 20 minutes.

The amount of dispersant necessary for blunging with a particular clay sample is easily determined by adding a test amount of the dispersant to a small laboratory sample of the clay, blunging the sample and assessing the degree of dispersion obtained. If the test sample is insufficiently dispersed, more dispersant may be added to the clay and a second test sample run. Alternatively, another dispersant may be tested with the clay.

Although the inventor is unaware of any generally used unit of measurement for blunging, a person of ordinary skill in the art can readily determine how to adapt the above described blunging step to their particular equipment by comparing the speed of the mixing or macerating edge of the rotor employed in the inventive procedure with the available equipment The preferred head diameter and rpm yield an edge speed of about 2,750 feet per minute where the speed of the edge of the head=π×diameter of head×rpm/12. Good commercial blunging equipment will generate edge speeds of up to about 5000 feet per minute.

Typical dispersants include sodium hexametaphosphate (Calgon®), sodium tripolyphosphate and tetrasodium pyrophosphate. Other dispersants which may be used include sodium silicate, potassium citrate, potassium citrate monohydrate, tripotassium salt monohydrate, potassium dihydrogen phosphate, potassium phospate, potassium pyrophosphate trihydrate, amino alcohols, polyalcohols, polyamines, polyphosphates, and organic polyacid alkali salts. The organic polyacid akali salts suitable for use as dispersant include sodium polyacrylate, potassium polyacrylate and ammonium polyacrylate. Linear polyphosphates with variable chain length but terminated by $Na_2PO_4$ groups may also be used. Although expensive, the corresponding rubidium and cesium salts of the above-listed dispersants may also be utilized. The preferred dispersant is sodium hexametaphosphate.

When the inventive process is used to treat very high viscosity kaolins with initial Brookfield viscosities from about 1,000 to about 4,000 cps, final treated clays with Brookfield viscosities of about 200 to about 770 cps are obtained, a viscosity reduction of about 70% to about 95%. When the inventive process is used to treat high viscosity kaolins with initial Brookfield viscosities less than about 1,000 cps, final treated clays with Brookfield viscosities of less than about 300 cps are obtained, a viscosity reduction of about 70% to about 90%.

To achieve viscosity reduction in kaolin clays with a Brookfield viscosity greater than about 2,000 cps, the inventive procedure must include the five process steps described above. If the starting kaolin clay has a viscosity less than about 2,000 cps, one or more processing steps may be omitted. Performance of the remaining steps will still yield a clay with reduced viscosity relative to the starting clay. If the clay is not chemically treated (i.e., step 2 is omitted), the first drying step (step 1) may also be omitted. However, omission of both the drying (step 1) and chemical treatment (step 2) will impair the effectiveness of the remaining viscosity reduction treatment steps (steps 3, 4 and 5). Regardless of the number of steps employed to process the clay, it is critical that the treatment steps be performed in the order specified above. These effects are illustrated below by the Comparative Example. All Brookfield viscosity measurements in the Comparative Example and Examples are conducted using TAPPI procedure T648 cm-88 or T671 cm-55

COMPARATIVE EXAMPLE

A series of controlled runs using a fine-grained Middle Georgia crude kaolin clay with an initial viscosity of 1,545 cps as starting material illustrates that the greatest stable viscosity reduction for a given clay will be achieved using the complete 5-step inventive process.

Treatment of this clay by step 5 alone (high-shear blunging as described above) reduces the viscosity to 1,020 cps. Treatment of the clay using step 1 alone (i.e., drying the degritted crude clay to a moisture content of about 2%) produces no reduction in viscosity. Treatment of the clay using step 4 alone (heat treatment at about 300° C. for about 2 hours) yields a clay that cannot be dispersed (and whose viscosity cannot therefore not be measured). Treatment of the clay using processing treatment steps 1, 2 and 3 (i.e, step 1; drying the degritted crude clay to a moisture content of about 2%; step 2; treating the clay with an aqueous solution of $K_2CO_3$ at a concentration of 0.11% of the weight of the dry clay followed by step 3; extrusion as described above) produces a clay with a temporary reduction in viscosity to 410 cps. But the clay is unstable and reverts to a higher viscosity over a period of a few hours. However, treatment of the clay using the complete 5-step process outlined above produces a clay with a viscosity of 210 cps that is stable for months.

The invention is illustrated by the following examples. The typical sample size used in the examples was 6 kg. Drying (step 1) and heat treatment (step 4) were both typically carried out in a convection oven. The pugging/extrusion of the sample (step 3) was normally conducted using a Hobart 4146 Food Processor. High-shear blunging (step 5) was carried out with equipment comparable to an 8 inch baffled canister with a 3.5 inch diameter Cowles head turning at about 1,000 rpm to about 5,000 rpm, preferably about 3,000 rpm for about 20 minutes. It is understood that one of ordinary skill in the art will understand how to vary the process conditions disclosed herein to achieve comparable results with the equipment available to them and appropriate to the size clay sample under investigation.

EXAMPLE 1

A fine-grained kaolin from central Georgia was dried to a moisture content of between about 1% to about 3%. The dried clay was then sprayed with water in which was dissolved 3 pounds of $K_2CO_3$ per ton (i.e., 0.15% of dry clay), and extruded at 80% solids by pugging with 3 passes through ⅛ inch diameter holes. The resulting extruded kaolin clay noodles were heated at about 300° C. in a convection oven for about 2 hours and then made down or dispersed by blunging with 6 pounds of sodium hexametaphosphate (Calgon®) as added dispersant per ton of dry clay at about 70% solids The Brookfield viscosity of the initial kaolin was about 1,545 cps. After treatment, the viscosity of the final processed clay was about 210 cps, a viscosity reduction of about 86%.

EXAMPLE 2

A montmorillonitic kaolin clay from the Inner Coastal Plain in the Dry Branch area of Georgia was degritted and subjected to the following viscosity reduction treatment. The Brookfield viscosity of the initial kaolin clay was too high for it to be slurried at high solids. The kaolin was first dried to a moisture content of about 5%. An aqueous solution of about 0.4% $Li_2CO_3$ (i.e., 8 pounds/ton of dried clay) was added to the dried clay by spraying. The clay-water mixture at about 78% solids was pugged with 3 passes through 5/32 inch diameter holes. The extruded noodles were then dried at about 300° C. for about 3 hours. The dried, extruded clay was then blunged as described in Example 1. After processing, the measured Brookfield viscosity of the final processed clay was about 400 cps at 70% solids.

EXAMPLE 3

A gray kaolin from Musquodoboit Valley, Nova Scotia, with an initial Brookfield viscosity of 650 cps at 70% solids, was dried to a moisture content of about 1% to about 3%. The dried clay was then sprayed with water in which was dissolved 6 pounds of $K_2CO_3$ per ton of dry clay [0.3 percent by dry weight], extruded at about 79% solids by pugging with 3 passes through 5/32 inch diameter holes. The resulting dried extruded noodles were then heated at about 300° C. in a convection oven for about 2 hours. The clay was then dispersed with about 5.5 pounds sodium hexametaphosphate (Calgon®) per ton of dry clay and blunged at about 70% solids. After treatment, the viscosity of the final processed clay was about 143 cps at 70% solids, a viscosity reduction of about 78%.

EXAMPLE 4

Degritted saprolite produced by weathering of fine-grained quartzo-feldspathic gneiss in the Warrenton area of Georgia with an initial Brookfield viscosity of 3,650 cps at about 70.5% solids, was dried to a moisture content of about 1.4%. The dried clay was then sprayed with water in which was dissolved 3 pounds of $K_2CO_3$ (0.15% by weight) per ton of dry clay and extruded at 78% solids with 3 passes through 5/32 inch diameter holes. The resulting noodles were heated at about 300° C. for about 2 hours, then dispersed with 12 pounds of sodium hexametaphosphate (Calgon®) per ton of dry clay at 70% solids. After treatment, viscosity of the final processed clay was about 640 cps at 70% solids, a viscosity reduction of about 82%.

EXAMPLE 5

The same degritted and dried kaolin as in Example 4 was sprayed with water in which was dissolved 12 pounds of LiCl (0.6% by dry weight) per ton of dry clay and pugged at 78% solids for a total of 6 passes. The resulting noodles were heat treated at 300° C. for 2 hours, cooled, and dispersed with 9 pounds of sodium hexametaphosphate (Calgon®) per ton of dry clay and blunged at about 70% solids. After the 5 Step treatment, its Brookfield viscosity was 770 cps at 70.8% solids, a reduction in viscosity of at least 79%.

EXAMPLE 6

K4, a degritted low brightness Nova Scotia kaolin, had an initial Brookfield viscosity of 2,475 cps at 70% solids. This kaolin was dried to a moisture content of 4%. The dried clay was sprayed with water in which was dissolved 6.38 pounds of $K_2CO_3$ (0.32% by dry weight) per ton of dry clay and pugged at 80% solids, 3 passes through 5/32" diameter holes in a die. The resulting noodles were heated at 300° C. for 3 hours, cooled, dispersed with 4.75 pounds of sodium hexametaphosphate (Calgon®) per ton of dry clay and blunged at about 70% solids. After the 5 Step treatment, the kaolin's Brookfield viscosity was 123 cps, a reduction in viscosity of about 95%.

EXAMPLE 7

SS4C4, a degritted composite of kaolin from saprolite derived from granite in the Sparta area, Georgia, has an initial Brookfield viscosity greater than 1200 cps at 68.8% solids (≈2700 cps at 70% solids). This clay was dried to a moisture content of 2.6%. It was sprayed with water in which was dissolved 12 pounds of $K_2CO_3$ (0.6% by dry weight) per ton of dry clay and pugged at 78% solids, 3 passes through a 5/32" diameter die. The resulting noodles were heat treated at 350° C. for 2 hours, cooled, dispersed with 13 pounds of sodium hexametaphosphate (Calgon®) per ton of dry clay and blunged at about 70% solids. After this 5 Step treatment, the Brookfield viscosity was 760 cps at 70% solids, a reduction in viscosity of at least 70%.

EXAMPLE 8

The kaolin used in Example 7, with an initial Brookfield viscosity greater than 1200 cps at 68.8% solids (≈2700 cps at 70% solids), was treated the same as in Example 8 except that the chemical added before heat treatment was 12 pounds of LiCl rather than 12 pounds of $K_2CO_3$. After the 5 Step procedure, its Brookfield viscosity was 490 cps at 70% solids, a reduction in viscosity of at least 80%.

EXAMPLE 9

SS5C2, a degritted composite of kaolin from saprolite derived from weathering of quartzo-feldspathic gneisses in the Warrenton area, Georgia, with an initial Brookfield viscosity of 1,070 cps at 67% solids (≈3300 cps at 70% solids), was dried to a moisture content of 2%. The dried clay was then sprayed with water in which was dissolved 12 pounds of $K_2CO_3$ (0.6% by weight) per ton of dry clay, pugged at 79% solids, heated at 350° C. for 2 hours, cooled and dispersed with 11 pounds of sodium hexametaphosphate (Calgon®) per ton of dry clay and blunged at 70% solids. After this procedure, its Brookfield viscosity was 980 cps at 70% solids, a reduction in viscosity of 68%.

EXAMPLE 10

The kaolin used in Example 9, with an initial Brookfield viscosity of 1,070 cps at 67% solids (≈3300 cps at 70% solids), was treated the same as in Example 9 except that the chemical added before heat treatment was 12 pounds of LiCl rather than 12 pounds of $K_2CO_3$. After treatment with the inventive five-step procedure, its Brookfield viscosity was 770 cps at 70.8% solids, a reduction in viscosity of more than 75%.

EXAMPLE 11

SS5C3, a degritted composite of kaolin from saprolite derived from weathering of quartzo-feldspathic gneisses in the Warrenton area, Georgia, with an initial Brookfield viscosity of 2,925 cps at 70% solids, was dried to a moisture content of about 2.6%. The dried clay was then sprayed with water in which was dissolved 12 pounds of $K_2CO_3$ (0.6% by dry weight) per ton of dry clay, pugged at 73% solids and heated at 325° C. for 2 hours. After this procedure, its Brookfield viscosity was 1400 cps at 70% solids, a reduction in viscosity of 52%.

EXAMPLE 12

The kaolin used in Example 11 was treated the same as in Example 11 except that the chemical added before heat treatment was 12 pounds of LiCl rather than 12 pounds of $K_2CO_3$. After treatment with the inventive 5-step procedure, its Brookfield viscosity was 1400 cps at 70% solids, the same as in Example 11, a reduction in viscosity of 52%.

This invention has been described in detail with particular reference to certain embodiments, but variations and modifications can be made without departing from the spirit and scope of the invention as defined in the following claims.

What is claimed is:

1. A process for treating clays, wherein the process comprises the steps of:
   (a) drying the clay;
   (b) mixing the dried clay with an aqueous solution of an alkali metal salt wherein the alkali metal salt is selected from the group consisting of lithium, potassium, rubidium and cesium salts;
   (c) extruding the material obtained from step (b);
   (d) heat-treating the material obtained from step (c); and
   (e) high-shear blunging of the material obtained from step (d) whereby a treated clay is produced having a reduced viscosity as compared to the initial clay when compared at equivalent solids content.

2. The process of claim 1 wherein the clay is dried in step (a) to a moisture content between about 1% to about 3% water at a temperature between about 95° C. and about 125° C.

3. The process of claim 2 wherein in step (b) the dried clay is mixed with an aqueous solution of an alkali metal salt in an amount sufficient to decrease the per cent solids content of the mixture to about 50% to about 82% solids.

4. The process of claim 3 wherein the per cent solids content is between about 75% to about 81% solids.

5. The process of claim 4 wherein the per cent solids content is between about 77% to about 80% solids.

6. The process of claim 3 wherein in step (c), the material obtained from step (b) is extruded through the holes in a die plate of a mixer.

7. The process of claim 6 wherein the die plate contains holes between about 1/8 inch to about 5/32 inch in diameter.

8. The process of claim 3 wherein in step (d), the material obtained from step (c) is heated from about 1 to about 2 hours at a temperature between about 150° C. to about 500° C.

9. The process of claim 8 wherein the temperature is between about 300° C. to about 350° C.

10. The process of claim 8 wherein in step (e) the high-shear blunging is done with a dispersant.

11. The process of claim 10 wherein the amount of alkali metal salt added in step (b) is from about 0.1% to about 0.8% of the weight of dried clay.

12. The process of claim 11 wherein the amount of alkali metal salt is from about 0.1% to about 0.3% of the weight of dried clay.

13. The process of claim 10 wherein the alkali metal salt is selected from the group consisting of lithium and potassium salts.

14. The process of claim 10 wherein the alkali metal salt is potassium.

15. A process for treating clays, wherein the process comprises the steps of:
- (a) drying the clay to a moisture content between about 1% to about 3% at a temperature between about 95° C. to about 125° C;
- (b) mixing the dried clay with an aqueous solution of an alkali metal salt so that the amount of added alkali metal salt is between about 0.1% to about 0.8% the weight of dried clay wherein the alkali metal salt is selected from the group consisting of lithium, potassium, rubidium and cesium salts;
- (c) extruding the material obtained from step (b);
- (d) heat-treating the material obtained from step (c) by heating the material from about 1 hour to about 2 hours at a temperature between 150° C. to about 500° C.; and
- (e) high-shear blunging of the material obtained from step (d) whereby a treated clay is produced having a reduced viscosity as compared to the initial clay when compared at equivalent solids content.

16. The process of claim 15 wherein the alkali metal salt is selected from the group consisting of lithium and potassium.

17. The process of claim 15 wherein the amount of added alkali metal salt is between about 0.1% to about 0.3% of the weight of dried clay.

18. The process of claim 17 wherein the alkali metal salt is selected from the group consisting of lithium and potassium.

19. The process of claim 1 wherein the viscosity of the treated clay is between about 10% to about 20% of the viscosity of the initial clay when compared at equivalent solids content.

20. The process of claim 15 wherein the viscosity of the treated clay is between about 10% to about 20% of the viscosity of the initial clay when compared at equivalent solids content.

21. A process for treating clays, wherein the process comprises the steps of:
- (a) extruding the clay wherein the clay to be extruded has a moisture content between about 1% to about 3% or has been heated at a temperature between about 95° C. to about 125° C. until the moisture content of the clay is between about 1% to about 3%;
- (b) heat-treating the material obtained from step (a) by heating the material from about 1 hour to about 2 hours at a temperature between 150° C. to about 500° C.; and
- (c) high-shear blunging of the material obtained from step (b) whereby a treated clay is produced having a reduced viscosity as compared to the initial clay when compared at equivalent solids content.

* * * * *